(12) United States Patent
Takeda et al.

(10) Patent No.: US 6,922,090 B2
(45) Date of Patent: Jul. 26, 2005

(54) TRANSITION SIGNALING CIRCUIT AND ARBITRATOR USING THIS CIRCUIT

(75) Inventors: Koichi Takeda, Saitama (JP); Kimito Horie, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 674 days.

(21) Appl. No.: 10/094,921

(22) Filed: Mar. 12, 2002

(65) Prior Publication Data

US 2003/0079153 A1 Apr. 24, 2003

(30) Foreign Application Priority Data

Oct. 19, 2001 (JP) ........................................ 2001-322605

(51) Int. Cl.[7] ................. G11C 7/00; H03K 19/096; G06F 1/12
(52) U.S. Cl. ..................... 327/141; 326/93; 326/98; 365/194; 713/600
(58) Field of Search .................... 327/141, 142, 327/155; 326/93, 98; 713/600; 716/17, 18

(56) References Cited

U.S. PATENT DOCUMENTS

| | | | |
|---|---|---|---|
| 5,646,554 A | * | 7/1997 | Kim et al. ............... 326/93 |
| 5,758,139 A | | 5/1998 | Sutherland et al. |
| 5,918,042 A | | 6/1999 | Furber |
| 6,023,430 A | * | 2/2000 | Izumikawa ............. 365/194 |
| 6,486,700 B1 | * | 11/2002 | Fairbanks et al. ....... 326/36 |

FOREIGN PATENT DOCUMENTS

| | | |
|---|---|---|
| JP | 06090165 A | 3/1994 |
| JP | 06096019 A | 4/1994 |
| JP | 06244890 A | 9/1994 |
| JP | 9-244890 | 9/1997 |
| JP | 11003206 | 1/1999 |

OTHER PUBLICATIONS (Ivan E. Sutherland: Micro–pipelines, CACM, vol. 32, No. 6, pp. 720–378) (disclosed on p. 1 of the specifiation as Document 1)Magazine "bit", vol. 22, No. 3, published by Kyoritsu Publishing, pp. 246–268; Paper from Commemorative Lecture on Winning 1998 ACM Turing Prize.

* cited by examiner

Primary Examiner—Dinh T. Le
(74) Attorney, Agent, or Firm—Volentine Francos & Whitt, PLLC

(57) ABSTRACT

The present invention implements an asynchronous transition signaling circuit which can be applied to a bus arbitrator or the like. The OR gate holds a token (feedback signal S) as long as the device enabling signal Grant is output, even after the request event ReqIn is canceled, and as a result, the Muller C element with an inverter cancels the output of the response event AckOut. When the device request signal Req is not output, the feedback signal S passes through the AND gate, and the request event ReqOut is output from the AND gate. At the same time, the device enabling signal Grant is no longer output, and the loop comprised of the Muller C element with an inverter, the OR gate and the AND gate is canceled. As a result, the token (feedback signal S) is transferred to the next transition signaling circuit.

9 Claims, 10 Drawing Sheets

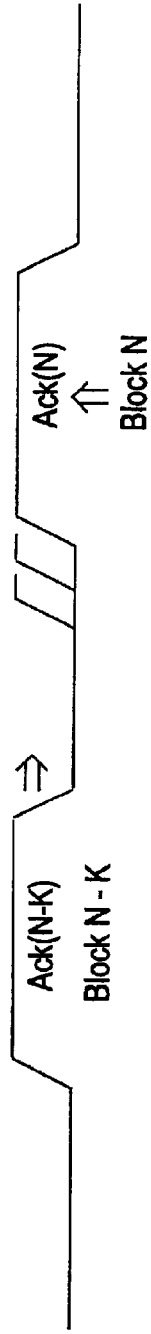
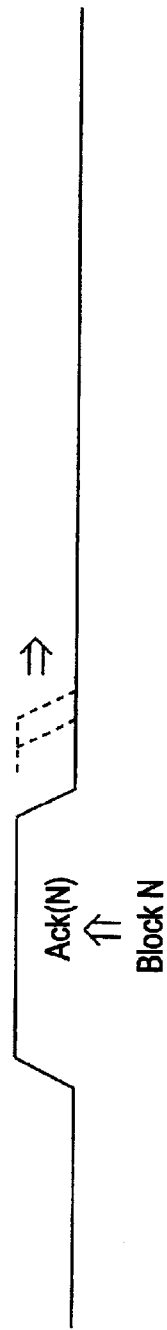
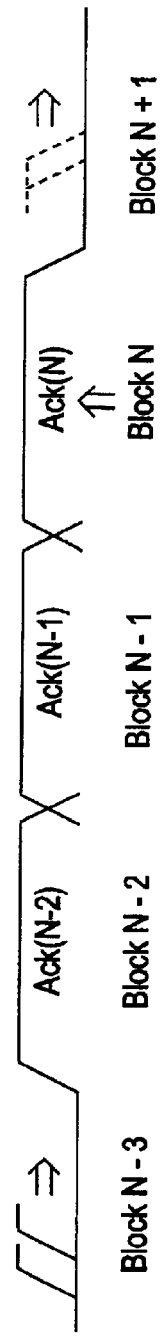
FIG.3(A) Switch 42-1
FIG.3(B) Switch 42-2
FIG.3(C) Switch 42-1 & Switch 42-2

TRANSITION SIGNALING CIRCUIT AND ARBITRATOR USING THIS CIRCUIT

BACKGROUND OF THE INVENTION

1. Field of the Invention

The present invention relates to a new circuit type transition signaling circuit comprised of Muller C elements used for pipeline control and other purposes, and an arbitrator which arbitrates the contention of devices using the transition signaling control circuit, which is used when the devices share a predetermined resource, such as a bus.

2. Description of Related Art

Prior art related to such a field is, for example, those stated in the following documents.

Document 1: Magazine "bit", Vol. 22, No. 3, published by Kyoritsu Publishing, pp. 246–268; Paper from Commemorative Lecture on Winning 1998 ACM Turing Prize (Ivan E. Sutherland: Micro-pipelines, CACM, Vol. 32, No. 6, pp. 720–378)

Document 2: Japanese Patent Laid-Open No. 6-90165

Document 3: Japanese Patent Laid-Open No. 6-96019

Document 4: Japanese Patent Laid-Open No. 9-244890

Document 5: Japanese Patent Laid-Open No. 11-3206

For example, as Document 1 states, a concept called "transition signaling" recently emerged as a concept which counters conventional clocked logic. This is a field of asynchronous design methodologies.

Conventional clocked logic is based on the premise that all signals are binary and the time thereof can be discrete. This means that Boolean logic, which is a logic to express the input conditions of a logic circuit and the result by algebraic expressions, can be applied, therefore circuit design is easier even for a relatively large scale circuit. In asynchronous design methodologies as well, all signals are binary, but the time thereof is not discrete, which is different from conventional clocked logic. As a result, the following three advantages are noteworthy.

The first advantage is that problems due to clock skew, such as the generation of a glitch in a large scale circuit, can be controlled.

The second advantage is that the power consumption of a logic circuit can be controlled in the case of asynchronous design methodologies since only the part of a logic circuit required for calculation need be operated, while in the case of clocked logic, the clock operation is continuously active for parts unnecessary for logic operation, so the power consumption of a logic circuit is high.

The third advantage is that the average speed of logic processing can be secured in the case of asynchronous design methodologies, but in the case of clocked logic, the speed of all logic processing can be controlled by the critical path (longest path).

The transition signaling circuit is comprised of modules which process the logical combination of events. In transition signaling, the transition of the logical value of the signal to both direction, that is, the rise transition and the fall transition of the signal, have the same meaning, and this rise transition and fall transition are called an "event". In the transition signaling method, the rise transition and the fall transition are not distinguished, but both edges of rise and fall are used as a trigger event, so potentially a two-times faster speed can be implemented compared with a conventional clock control method.

As Document 1 states, the Muller C element, for example, is one of the transition signaling circuits, providing an AND function for a transition event. Other transition signaling circuits include an XOR element, which provides an OR function of a transition event, and a TOGGLE element.

FIG. 7(A) and FIG. 7(B) are block diagrams of examples of a conventional Muller C element with an inverter, which is one transition signaling circuit, where FIG. 7(A) is a logical symbol diagram and FIG. 7(B) is a logical circuit diagram.

In the Muller C element with an inverter (i.e. inverter-provided Muller C element) 10, transition signals, such as the two request events ReqIn 1 and ReqIn 2, are supplied to the two input terminals thereof as input signals, and the request event ReqOut 1, which is a transition signal, is output from the output terminal thereof. This Muller C element with an inverter 10 is comprised of the inverter circuit 11 for signal inversion, the two input type first, second and third AND gate circuits 12, 13 and 14, and a three input type OR gate 15.

Request event ReqIn 2 to be input is inverted by the inverter circuit 11, and the second and third AND gate circuits 13 and 14 are connected to the output terminal. The request events ReqIn 1 and ReqOut 1 are input to the first AND gate circuit 12. The request event ReqIn 1 and the output signal of the inverter circuit 11 are input to the AND gate circuit 13. The output signal of the inverter circuit 11 and the request event ReqOut 1 are input to the AND gate circuit 14. These AND gate circuits 12, 13 and 14 are connected to the OR gate 15, and the request event ReqOut 1 is output from the output terminal of the OR gate 15 circuit. The AND gate circuit 12 and the OR gate circuit 15 constitute a latch circuit, and the AND gate circuit 14 and the OR gate circuit 15 also constitute a latch circuit.

In the case of such a Muller C element with an inverter 10, when the two input request events ReqIn 1 and ReqIn 2 have different values (e.g. logic level "H" and "L") from each other, a value the same as the request event ReqIn 1 is output from the OR gate circuit 15 as an output request event ReqOut 1, and the value of this output is maintained in the latch circuit comprised of the AND gate circuit 12 and the OR gate circuit 15, or in the latch circuit comprised of the AND gate circuit 14 and the OR gate circuit 15, even if one of the input request events ReqIn 1 and ReqIn 2 changes later. When the two input request events ReqIn 1 and ReqIn 2 have the same value (e.g. logic level "H" and "H", or logic level "L" and "L") and if one of the inputs changes later, a value the same as the request event ReqIn 1 is output from the OR gate circuit 15 as an output request event ReqOut 1.

It is not assumed that both of the two input request events ReqIn 1 and ReqIn 2 change simultaneously, which is the same as the case of a reset/set type flip-flop.

As mentioned above, transition signals, such as ReqIn 1, ReqIn 2 and ReqOut 1, can be regarded as an event for a logical unit, and the Muller C element operates as an AND gate circuit for the event. The Muller C element with an inverter, on the other hand, transfers an event only when events having different logic from each other occur to both of the inputs. Fundamentally this creates a directional flow of events.

As Document 1 states, a pipeline is referred to as a device configuration to process data in a work flow. In the pipeline, data is stored and processed. The pipeline is operated by clock control (each section is operated according to a clock distributed from the outside) or is driven by an event (each section is independently operated each time a local event is generated).

Some kinds of pipelines are inelastic, where the data volume inside the pipeline is fixed. In the case of an inelastic pipeline, the speed of input and the speed of output of a signal must accurately match, therefore this pipeline operates just like a shift register when processing logic is excluded.

In the case of an elastic pipeline, on the other hand, the data volume inside the pipeline is variable, and the speed of input and the speed of output of a signal constantly changes depending on the buffering. The elastic pipeline operates as an FIFO (First-In-First-Out) memory when the processing logic is excluded. An elastic pipeline with a simple configuration driven by an event (regardless the presence and absence of the requirements of internal processing) is called a "micro-pipeline".

FIG. 8 is a conceptual diagram depicting a control circuit of the conventional micro-pipeline stated in Document 1.

This control circuit of the micro-pipeline has the left side block 20-1 and the right side block 20-2 shown in FIG. 8. The left side block 20-1 has a Muller C element with an inverter 10-1 having the same configuration as shown in FIG. 7 where the request event Req (1), which is a transition signal, and the response event Ack (2), which is a transition signal from the right side block 20-2, are input. From the output terminal of this Muller C element with an inverter 10-1, the response event Ack (1), which is a transition signal, is output. The delay element 21-1 which delays the response event Ack (1) for the delay time DELAY 1 and outputs the request event Req (2), which is a transition signal, is connected to the output terminal of the Muller C element with an inverter 10-1.

In the same way, the right side block 20-2 has a Muller C element with an inverter 10-2, the same as shown in FIG. 7, where the request event Req (2), which is a transition signal, and the response event Ack (3), which is a transition signal, are input. The Muller C element with an inverter 10-1 and the delay element 21-2 are connected to this output terminal. The delay element 21-2 inputs the response event Ack (2), which is a transition signal output from the Muller C element with an inverter 10-2, delays this for the delay time DELAY 2, and outputs the request event Req (3), which is a transition signal.

In this pipeline, a set of connection circuits, where the left side block 20-1 and the right side block 20-2 are connected in this sequence, is one unit, and many other sets are sequentially connected before and after this one-unit set.

In FIG. 8, the logic circuit to be controlled by the control circuit of the micro-pipeline is omitted, but the data flow (from the input data Din to the output data Dout), which passes through the logic circuit, is indicated by the dashed line. In Document 1, a latch circuit, decoding circuit, and multiplication circuit are shown as an example of the logic circuit to be controlled.

FIG. 9 is a timing waveform diagram depicting the operation of the control unit of the micro-pipeline in FIG. 8. Now the operation of the control circuit of the micro-pipeline in FIG. 8 will be described with reference to FIG. 9.

As described above, the control circuit of the micro-pipeline in FIG. 8 is comprised of a combination of two blocks, where both the left side block 20-1 and the right side block 20-2 have the same circuit configuration.

For example, when a request event Req (1) is generated at the left side block 20-1 (corresponding to the logical level "H"), if the right side block 20-2 has not yet been activated and the response event Ack (2) has also not yet been generated (corresponding to the logic level "L"), then the response event Ack (1) is generated from the Muller C element with an inverter 10-1, and control for the logic circuit, which is not illustrated, is acquired. (This link is indicated by L1 in FIG. 9.)

The response event Ack (1) is delayed for a predetermined delay time DELAY 1 by the delay element 21-1, and becomes the request event Req (2) for the right side block 20-2. (This link is indicated by L2 in FIG. 9.)

Then the response event Ack (2) is also generated from the Muller C element with an inverter 10-2 in the right side block 20-2 based on the same logic, and the response event Ack (2) is fed back to the Muller C element with an inverter 10-1, so the response event Ack (1) loses the control thereof. (This link is indicated by L3 and L5 in FIG. 9.)

In other words, the response event Ack (1) generated from the Muller C element with an inverter 10-1 acquires control for the logic circuit, which is not illustrated, only during a predetermined delay time DELAY 1 of the delay element 21-1, and then the control is transferred to the response event Ack (2) generated from the Muller C element with an inverter 10-2.

The request event Req (1) itself also disappears after the delay time DELAY 0 of the delay element, which is not illustrated, in the left side block 20-0, which is not illustrated. (This is indicated by the link L4 in FIG. 9.) In the same way, the request event Req (2), which is output from the delay element 21-1, disappears after the delay time DELAY 1 in the left side block 20-1. (This is indicated by the link L6 in FIG. 9.)

When the request event Req (1) is generated in the left side block 20-1, however, the response event Ack (1) does not change at all due to the nature of the Muller C element with an inverter 10-2 if the right side block 20-2 has already been activated, and if the event Ack (2) has been generated. This is indicated by the link L3 (broken line) which became invalid in the event Ack (2) #1 and in the event Ack (1) #1 generated in the link L7 in FIG. 9.

Disappearance of the response event Ack (2) is also the same as the disappearance of the response event Ack (1), which disappears in the link L8 in FIG. 9 when the response event Ack (3) to be input to the Muller C element with an inverter 10-2 is received.

The meaning of the delay times DELAY 0, DELAY 1, and DELAY 2 in FIG. 9 is quite significant. If the delay times DELAY 0, DELAY 1 and DELAY 2 do not exist, then the delay time of the logic circuit to be controlled, which is not illustrated, cannot be secured. Therefore the request events Req (1), . . . and the response events Ack (1), . . . , which are transition signals, take charge, and as a result, asynchronous transition signaling cannot be implemented.

According to Document 1, the control circuit in FIG. 8 operates according to a simple stage state rule. In other words, if the state of the first or preceding block 20-2 and the next or succeeding block 20-1 are different, the state of the first block is transferred to the next block 20-1, otherwise the current state is maintained. For this stage state rule, a differential equation to define ocean waves and electromagnetic waves is analogized. Actually, in the control circuit of the micro-pipeline in FIG. 8, one of the inverters of the Muller C elements with an inverter 10-1 and 10-2 is included in the loop where an event cycles around, so each loop oscillates, the request event Req (1) propagates to the right side in FIG. 8, and the response event Ack (1) propagates to the left side in FIG. 8.

For example, according to the timing waveform in FIG. 9, the response event Ack (1) transits to the response event Ack (2). In the control circuit in FIG. 8, an event generated in the left side block 20-1 is transferred to the right side block 20-2, so this operation is similar to an FIFO. Here, events are accumulated according to FIFO, and events which end in the left side block 20-1 are sequentially transferred to the right side block 20-2, . . . . Generally this operation is suitable for the control of a micro-pipeline.

In the case of the conventional control circuit of the micro-pipeline in FIG. 8, however, the problem is that the application range of asynchronous transition signaling using this conventional control circuit is narrow, as described in the following (a) and (b).

(a) The conventional control circuit of the micro-pipeline shown in FIG. 8 has a logic circuit structure where the control signal and the logic circuit to be controlled, which is not illustrated, are combined. Therefore in the control circuit of the micro-pipeline in FIG. 8, control becomes valid only during a predetermined delay time DELAY 1, . . . , then the control is propagated to the next block, just like a wave. As long as the logical delay time of the logic circuit to be controlled, which is not illustrated, does not exceed the propagation time of the control thereof, this asynchronous transition signaling functions effectively. However, in some cases the propagation of the control may not be an effective signal control. Generally, such a unit as a processor is comprised of devices having various input/output interfaces. And many of the devices cannot be included into asynchronous transition signaling since the upper limit delay time is not defined. A device which requires interrupt control, such as DMA (Direct Memory Access, which is direct data transfer between memories) and a timer, is an example of this type of device for which asynchronous transition signaling using the control circuit of the micro-pipeline in FIG. 8, cannot be used.

(b) FIG. 10 is a block configuration diagram of a conventional general bus arbitrator. In this bus arbitrator, a plurality of (N) number of devices, 30-1–30-N, such as memories, are connected to the common bus 31, and requests for use of this bus are arbitrated by the control circuit 32. When the common bus 31 is used, the devices 30-1–30-N output the device request signals Req 1-Req N to the control circuit 32. The control circuit 32 arbitrates contention of the device request signals Req 1-Req N. According to the arbitration, a device enabling signal (one of Grant 1–Grant N) is provided to one of the devices (30-1–30-N) according to the arbitration, so that this device uses the common bus 31 for a predetermined period, and the other devices standby for use.

The case when the control circuit 32 of such a bus arbitrator is comprised of the control circuit of the micro-pipeline in FIG. 8 is considered. Time to occupy the common bus 31 for the devices 30-1–30-N, which use the common bus 31, is irregular depending on the devices 30-1–30-N. Therefore generally the use of the control circuit of the micro-pipeline in FIG. 8 is inappropriate for such asynchronous transition signal control.

SUMMARY OF THE INVENTION

It is an object of the present invention to solve the above mentioned problems of prior art, and to provide a transition signaling circuit to implement asynchronous transition signaling which can be applied to bus arbitrators.

It is another object of the present invention to provide an arbitrator using this transition signaling circuit.

With the foregoing in view, the inventor of the present application studied various issues and concluded that if a logic circuit structure could be created with only control signals, unlike the conventional logic circuit structure, then a transition signaling circuit which can solve the above mentioned problems can be implemented.

Therefore in the present invention, a circuit system based on a new concept is proposed to implement asynchronous transition signaling which can be applied to bus arbitrators.

In other words, the transition signaling circuit of the present invention is comprised of a first Muller C element with an inverter, a first gate circuit, and a second Muller C element with an inverter.

The first Muller C element with an inverter is comprised of a first positive input terminal, a first negative input terminal, and a first output terminal. A first transition signal is input to the first positive input terminal. A feedback signal is input to the first negative input terminal. And a second transition signal is output from the first output terminal. When the first transition signal and the feedback signal have different logical values (levels), the second transition signal has a logical value (level) the same as that of the first transition signal. And when the first transition signal and the feedback signal have a same logical value (level), on the other hand, the second transition signal maintains the previous status.

The first gate circuit is a circuit comprised of a first input terminal for inputting the second transition signal which is output from the first output terminal of the first Muller C element with an inverter, a second input terminal for inputting a first control signal, and a second output terminal for turning ON/OFF by the first control signal, and outputting an output signal corresponding to the second transition signal in ON status.

The second Muller C element with an inverter is comprised of a second positive input terminal, a second negative input terminal, and a third output terminal. An output signal, which is output from the first gate circuit, is input to the second positive input terminal. A third transition signal is output to the second negative input signal. And a feedback signal is output from the third output terminal to the first negative input terminal of the first Muller C element with an inverter. When the output signal of the first gate circuit and the third transition signal have different logical values (levels), a feedback signal which has the same logical value (level) as this output signal is output from the third output terminal. When the output signal of the first gate circuit and the third transition signal have a same logical value (level), on the other hand, the feedback signal maintains the previous status.

The transition signaling circuit of the present invention is characterized in that the logical circuit structure is comprised of only control signals, where a concept called "token" is used. And a token can be held in a loop which is comprised of a gate circuit, which turns ON/OFF by the control signal and the second Muller C element with an inverter connected to the output side of the gate circuit. By using a new asynchronous transition signaling circuit where a token can be transferred, a bus arbitrator can be implemented.

It is preferable that the transition signaling circuit of the present invention further comprises a second gate circuit and a third gate circuit, in addition to the above mentioned first Muller C element with an inverter, the first gate circuit, and the second Muller C element with an inverter.

The second gate circuit is a circuit which is comprised of a third input terminal connected to the third output terminal of the second Muller C element with an inverter, a fourth input terminal for inputting the second control signal, and a fourth output terminal which turns ON/OFF by the second control signal, turns ON when the second control signal is at the second logical value (level), and outputs the fourth transition signal corresponding to the feedback signal.

The third gate circuit is a circuit which is comprised of a fifth input terminal connected to the third output terminal of the second Muller C element with an inverter, a sixth input terminal for inputting the second control signal, and a fifth output terminal which turns ON/OFF by the second control signal, turns ON when the second control signal is at the first logical value (level), and outputs the first control signal corresponding to the feedback signal to the second input terminal of the first gate circuit.

According to this configuration, the second and the third gate circuits turn ON/OFF when the second control signal is input. When the second control signal is at the second logical value (level), the second gate circuit turns ON and the fourth transition signal corresponding to the feedback signal is output. When the second control signal is at the first logical value (level), the third gate circuit turns ON, and the first control signal corresponding to the feedback signal is output to the second input terminal of the first gate circuit. And if a token is held by the first gate circuit and the second Muller C element with an inverter when the second control signal is input, the first control signal is output from the third gate circuit. If such a new asynchronous transition signaling circuit where a token is transferred is used, a bus arbitrator can be implemented.

An arbitrator of the present invention is comprised of, a plurality of devices which request shared use of a predetermined resource, such as a bus, by outputting the second control signal respectively when the resource is shared, and a control means having the transition signaling circuit according to the second invention, which is disposed respectively for each of the plurality of devices.

The plurality of transition signaling circuits disposed for the control means are sequentially cascade-connected. In other words, the output terminal for outputting the fourth transition signal in the transition signaling circuit in the previous stage is connected to the input terminal for inputting the first transition signal in the transition signaling circuit in the next stage, and the input terminal for inputting the third transition signal in the transition signaling circuit in the previous stage is connected to the output terminal for inputting the second transition signal in the transition signaling circuit in the next stage. When the second control signals output from the plurality of devices are input to the respective transition signaling circuit, this control means arbitrates each device by outputting the first control signal to permit use so as to arbitrate the contention of these devices.

According to an arbitrator with this configuration, when the second control signals which are output from a plurality of devices are received, the control means outputs the first control signal for use permission to arbitrate the contention of the devices. By this, a predetermined resource, such as a bus, can be shared smoothly.

To implement this arbitrator, it is suitable to set an initial value of the Muller C element with an inverter constituting the transition signaling circuit so that a token exists only at one of the plurality of transition signaling circuits. By this, even if a token is held by a transition signaling circuit, the token circulates through the transition signaling circuits, and the opportunity to occupy a predetermined resource can be assigned to any device by arbitration.

According to another preferred example, the predetermined resource is a common bus, and arbitration is executed such that only one of the plurality of devices connected to the common bus occupies this common bus. By this, even a device which is not really appropriate for asynchronous transition control can be the target of bus arbitration.

BRIEF DESCRIPTION OF THE DRAWINGS

The foregoing and other objects, features and advantages of the present invention will be better understood from the following description taken in connection with the accompanying drawings, in which:

FIGS. 3(A), 3(B) and 3(C) are timing charts depicting the timing of the theoretical circuit configuration in FIG. 2;

DESCRIPTION OF THE PREFERRED EMBODIMENTS (Description of the Principle)
(1: Description of the Configuration)

Figure 2:
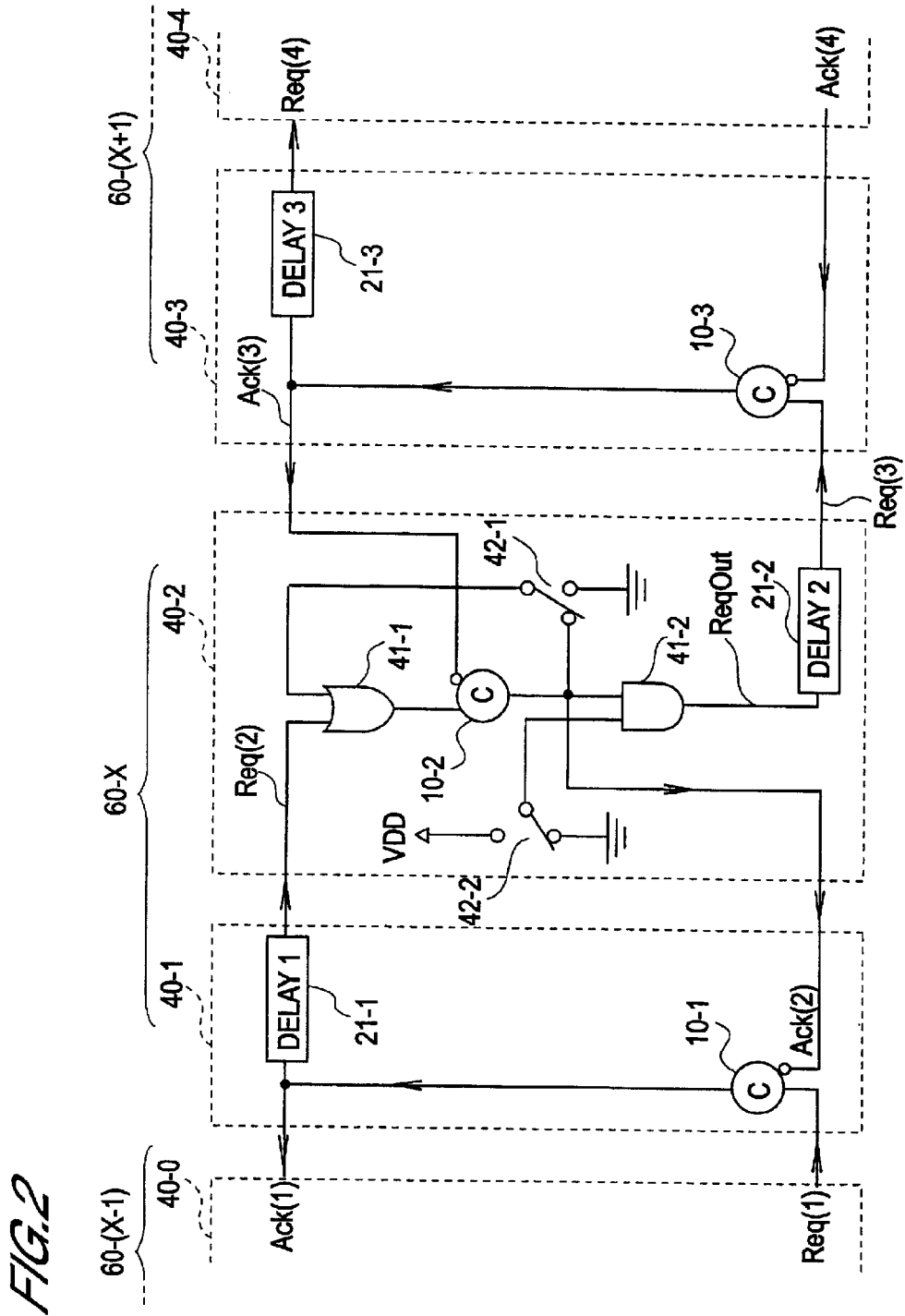
FIG. 2 is a circuit diagram depicting the principle of the embodiment of the present invention.
Figures 7A, 7B:
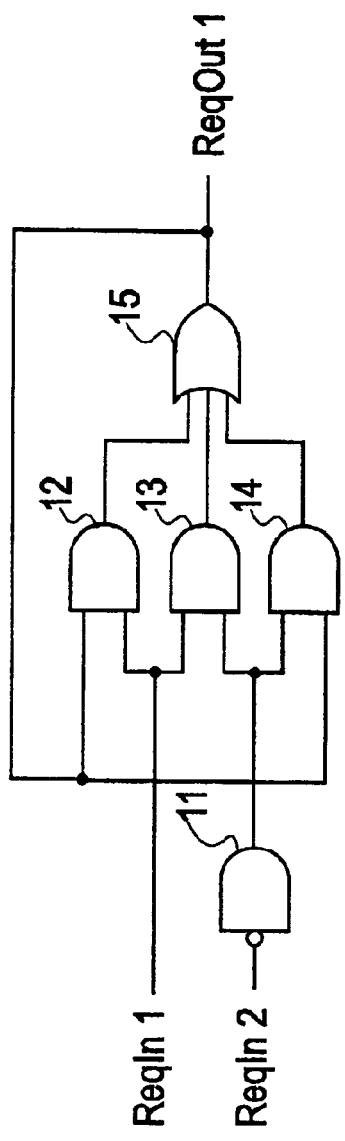
FIG. 7(A) is a logical symbol diagram used for describing a conventional Muller C element with an inverter.
FIG. 7(B) is a logical circuit diagram of FIG. 7(A)
Figure 8:
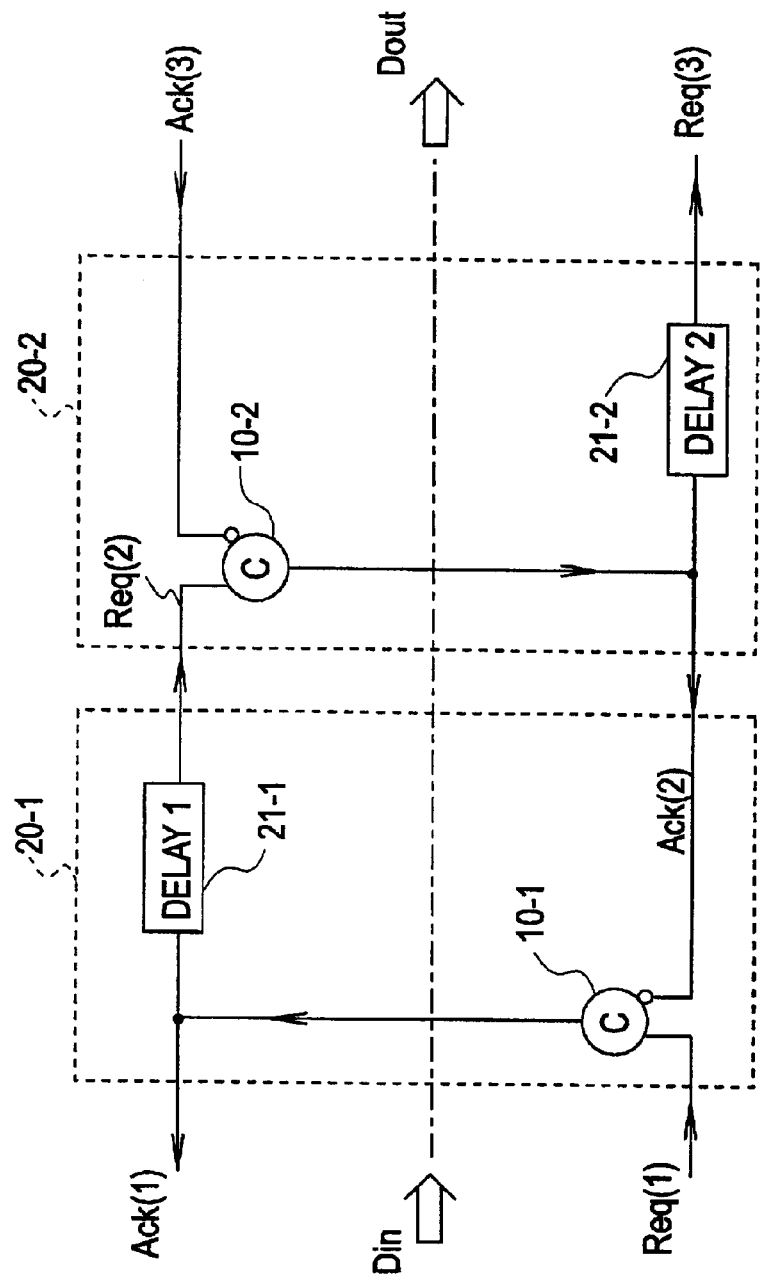
FIG. 8 is a conceptual diagram depicting a conventional micro-pipeline.
Figure 9:
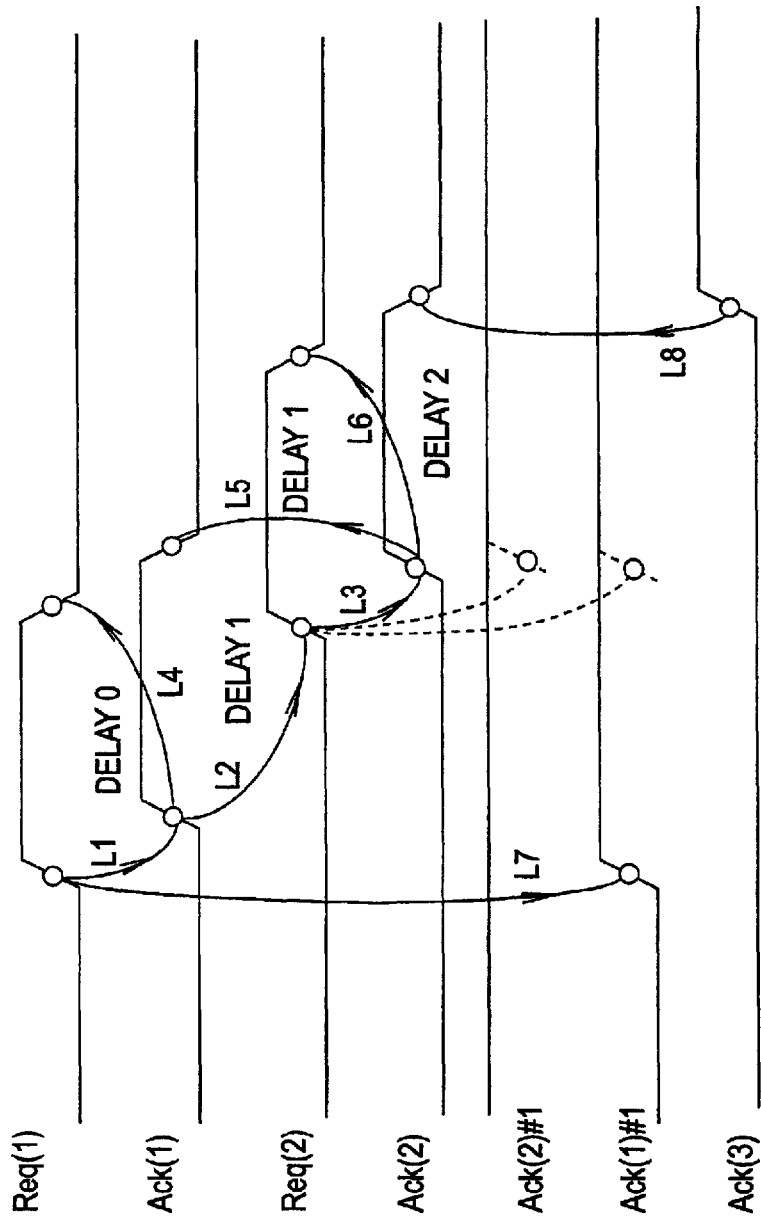
FIG. 9 is a timing waveform diagram depicting the operation in FIG. 8.

FIG. 2 is a diagram depicting the principle of the embodiment of the present invention, where elements common with the conventional elements in FIG. 7 and FIG. 8 are denoted with the same numerals.

In FIG. 2, a plurality of blocks, 40-1, 40-2, 40-3, . . . , from the first to the Nth (N is a positive integer), are cascade-connected.

In FIG. 2, however, only blocks 40-1, 40-2 and 40-3 are shown. Odd number blocks have the same circuit configuration. Even number blocks also have the same configuration. An odd number block and the next even number block adjacent thereto are a pair, and constitute one transition signaling circuit. Therefore transition signaling circuits (60-(X−1), 60-X, 60-(X+1) . . . ) with the same circuit configuration are sequentially connected like a ladder.

In the configuration example shown in FIG. 2, the first block 40-1, for example, is an odd number block, and the second block 40-2 adjacent to this is an even number block, and the first and second blocks constitute one transition signaling circuit 60-X.

Just like the left side block 20-1 in FIG. 8, the first block 40-1 is comprised of a Muller C element with an inverter (also called the first Muller C element with an inverter) 10-1, and a delay element 21-1 having the delay time DELAY 1

(also called the first delay element). In the Muller C element with an inverter 10-1, the request event Req (1), which is a transition signal, is input to the positive input terminal, the response event Ack (2), which is a transition signal from the second block 40-2, is input to the negative input terminal, and the response event Ack (1), which is a transition signal, is output from the output terminal. The delay element 21-1 is connected to the output terminal of the Muller C element with an inverter 10-1. The delay element 21-1 inputs the response event Ack (1) from the input terminal, delays this for the delay time DELAY 1, and outputs the request event Req (2), which is a transition signal, from the output terminal to the second block 40-2.

The second block 40-2 corresponds to the right side block 20-2 in FIG. 8, and is comprised of a Muller C element with an inverter (also called the second Muller C element with an inverter) 10-2, similar to FIG. 8, and a delay element having the delay time DELAY 2 (also called the second delay element) 21-2, a two input OR gate 41-1, a two input AND gate 41-2, and a first and second switches 42-1 and 42-2.

In the OR gate 41-1, the first input terminal is connected to the output terminal of the delay element 21-1, and the second input terminal is connected to the ground (logical level "L") side or to the second input terminal of the AND gate 41-2 via the first switch 42-1. In the OR gate 41-1, the output terminal is connected to the positive input terminal of the Muller C element with an inverter 10-2. In the OR gate 41-1, the gate of the second input terminal connected to the first switch 42-1 opens when the level is "L", for example, and a signal corresponding to the request event Req (2), to be input to the first input terminal, is output from the output terminal. In the Muller C element with an inverter 10-2, the response event Ack (3), which is a transition signal from the third block 40-3, is input to the negative input terminal, and the output terminal is connected to the first switch 42-1 and the second input terminal of the AND gate 41-2.

In the AND gate 41-2, the first input terminal is connected to the power supply VDD (logical level "H") side or to the GND (logical level "L") side by the second switch 42-2. The AND gate 41-2 is set such that the second input terminal is connected to the output terminal of the Muller C element with an inverter 10-2, and the second input terminal is connected to the second input terminal of the OR gate 41-1 by the first switch 42-1.

The AND gate 41-2, where the output terminal is connected to the delay element 21-2, opens when the first input terminal connected to the switch 42-2 is at level "H", and outputs the output signal according to the input signal of the second input terminal from the output terminal. The AND gate 41-2 closes when the first input terminal is in level "L".

The second delay element 21-2 delays the output signal of the AND gate 41-2 for the delay time DELAY 2, and outputs the request event Req (3), which is a transition signal, to the third block 40-3, which constitutes the transition signaling circuit 60-(X−1) in the next stage.

Just like the first block 40-1, the third block 40-3 is comprised of a Muller C element with an inverter (also called the third Muller C element with an inverter) 10-3, and a delay element 21-3 having the delay time DELAY 3 (also called the third delay element).

In the Muller C element with an inverter 10-3, the positive input terminal is connected to the output terminal of the delay element 21-2, and the negative input terminal receives the response event Ack (4), which is a transitional signal from the fourth block 40-4, as an input signal. The response event Ack (3) is output from the output terminal of the Muller C element with an inverter 10-3 to the second block 40-2 in the previous stage.

In the delay element 21-3, the input terminal is connected to the negative input terminal of the Muller C element with an inverter 10-2, and to the output terminal of the Muller C element with an inverter 10-3. The delay element 21-3 delays the response event Ack (3) which is input from the input terminal thereof for the delay time DELAY 3, and outputs the request event Req (4) to the fourth block.

In the block 40-2, for example, if the switch 42-1 is connected to the GND side to open the OR gate 41-1, and if the switch 42-2 is connected to the power supply VDD side to open the AND gate 41-2, the block 40-2 operates the same way as the right side block 20-2 in FIG. 8.

(2: Description on Roles of First and Second Switches)

FIGS. 3(A)–3(C) are diagrams depicting the timing of the theoretical configuration of the transition signaling circuit in FIG. 2. FIG. 3(A) depicts the effect of the first switch 42-1, FIG. 3(B) depicts the effect of the second switch, and FIG. 3(C) depicts the effect when both the first and second switches 42-1 and 42-2 are used.

FIG. 3 shows the case when the block N is comprised of the logical circuit of the second block 40-2 in FIG. 2, and another block N-K is comprised of such a logic circuit as the first block 40-1 and 40-3 in FIG. 2.

(Description of Effect of First Switch in FIG. 3(A))

Assume that the switch 42-1 of the second block 40-2 in FIG. 2 is connected to the output side of the Muller C element with an inverter 10-2, and the switch 42-2 is connected to the power supply VDD side. In the second block 40-2, when the request event Req (2) from the block 40-1 in the previous stage, specifically, from the delay element 21-1 reaches the OR gate 41-1, this request event Req (2) is latched by the loop, which is comprised of the OR gate 41-1 and the Muller C element with an inverter 10-2. This state operates such that the operation of the control circuit of the micro-pipeline in FIG. 8 is restricted.

The event Ack (N-K) (corresponding to the request event Req (2)) sent from the first block 40-1 at the left side in FIG. 2 is locked in this block N. As a result, succeeding events (e.g. Ack (N-K)) approach the block N in sequence after the event Ack (N-K) is input first, but control is stopped before the transition signaling circuit which includes the first block, that is, by the transition signaling circuit in the previous stage. In other words, if the events seems to be ocean waves or electromagnetic waves, the block N functions as a break water, in terms of ocean waves.

(Description on the Effect of the Second Switch in FIG. 3(B))

Assume that the switch 42-1 of the second block 40-2 in FIG. 2 is connected to the output side of the Muller C element with an inverter 10-2, and the switch 42-2 is connected to the power supply VDD side, where the AND gate 41-2 is open. Also assume that in the third block 40-3, . . . at the right side of the block N, that is, in the transition signaling circuits in the subsequent stages, the processing of a backlog is advancing. In this case, the event Ack (N-K) is locked in this block N, so the block N continuously generates the events Ack (N) (corresponding to the request event Req (3)) to the right side blocks 40-3, . . . as if it were a wave source.

Now assume that the switch 42-1 of the second block 40-2 in FIG. 2 is connected to the output side of the Muller C element with an inverter 10-2, and the switch 42-2 is connected to the GND side, where the AND gate 41-2 is closed. In this case, the response event Req (2) disappears due to the AND gate 41-2. In this case, in the blocks at the right side of the block N, that is, in the blocks in the transition signaling circuits in the subsequent stages, the processing of a backlog advances since the response events Req (2) disappear in sequence, and are not input. However, even if the processing of a backlog advances, the event generation and the transition to the right side block does not occur in the block N. In other words, this resembles a disappearance of waves, in terms of ocean waves or electromagnetic waves.

(Description on the Effect when Both the First and Second Switches in FIG. 3(C) are Used)

If both the first and second switches 42-1 and 42-2 are used by switching the control signal, then the block N can be used as if it were a gate for the transition event.

In FIG. 3(C), the switch 42-1 in the second block 40-2 in FIG. 2 is connected to the output side of the Muller C element with the inverter 10-2, and the switch 42-2 is connected to the GND side, where the AND gate 41-2 is closed. In this case, the event is locked in a loop, which is comprised of the OR gate 41-1 and the Muller C element with an inverter 10-2. However, this locked event is not transferred to the right side block 40-3 since the switch 42-2 is connected to the GND side. If there is no event in the first block 40-1 at the left, then a wave is isolated in the block N. This state is like a soliton, in terms of electro-magnetic waves. In the present embodiment, the soliton is considered using a concept called token access, so as to implement the transfer of the soliton.

(3: Description on the Comparison with the Conventional Control Circuit in FIG. 8)

The second difference when the second block 40-2 in FIG. 2 is compared with the block 20-2 in FIG. 8 is as follows.

In the case of the block 20-1 in FIG. 8, the control signal directly controls the logic circuit, which is not illustrated, and controls the data flow (from the input data Din to the output data Dout). In the case of the second block 40-2 in FIG. 2, on the other hand, the control or response event Ack (2) does not have to directly control the logical circuit. This means that control does not have to be transferred since a token is held in the loop comprised of the OR gate 41-1 and the Muller C element with an inverter 10-2.

Whereas the conventional asynchronous transition signaling, such as in FIG. 8, must transfer control since the circuit configuration cannot hold a token. In this sense, in the transition signaling circuit of the present invention, the loop comprised of the OR gate 41-1 and the Muller C element with an inverter 10-2 corresponds to the latch circuit of clocked logic. The difference is that not simple data but such data as control event Ack (2) is held.

(First Embodiment)
(1) Configuration

Figure 1:
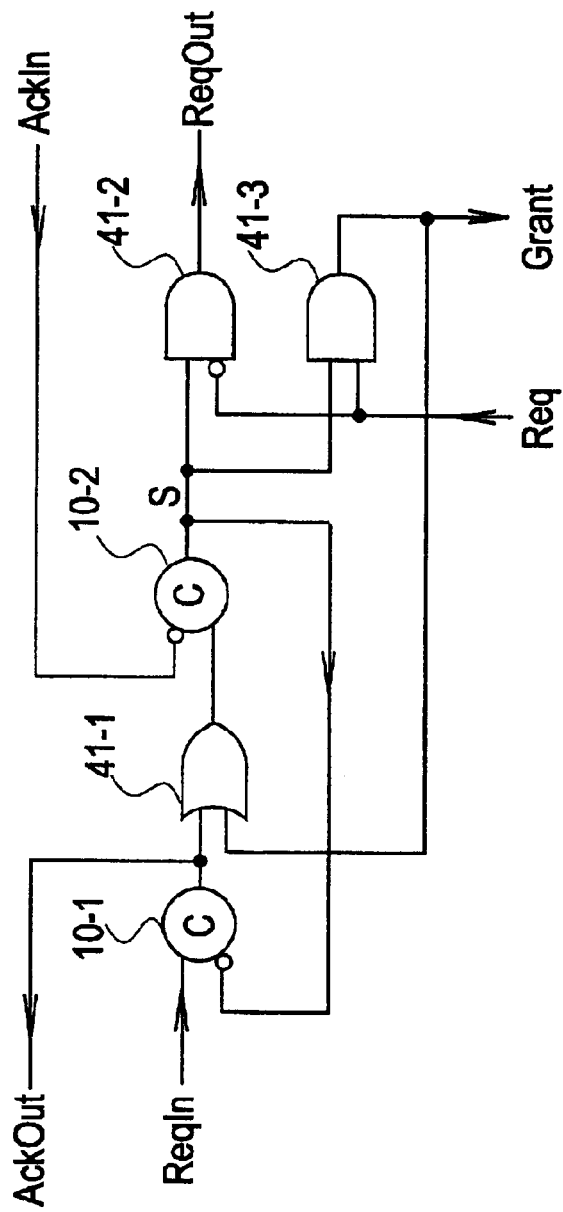
FIG. 1 is a block diagram depicting the transition signaling circuit according to the first embodiment of the present invention.

FIG. 1 is a block diagram depicting an example of the transition signaling circuit according to the first embodiment of the present invention, where composing elements the same as the composing elements in the principle explanation diagram in FIG. 2 are denoted with the same numerals.

Figure 10:
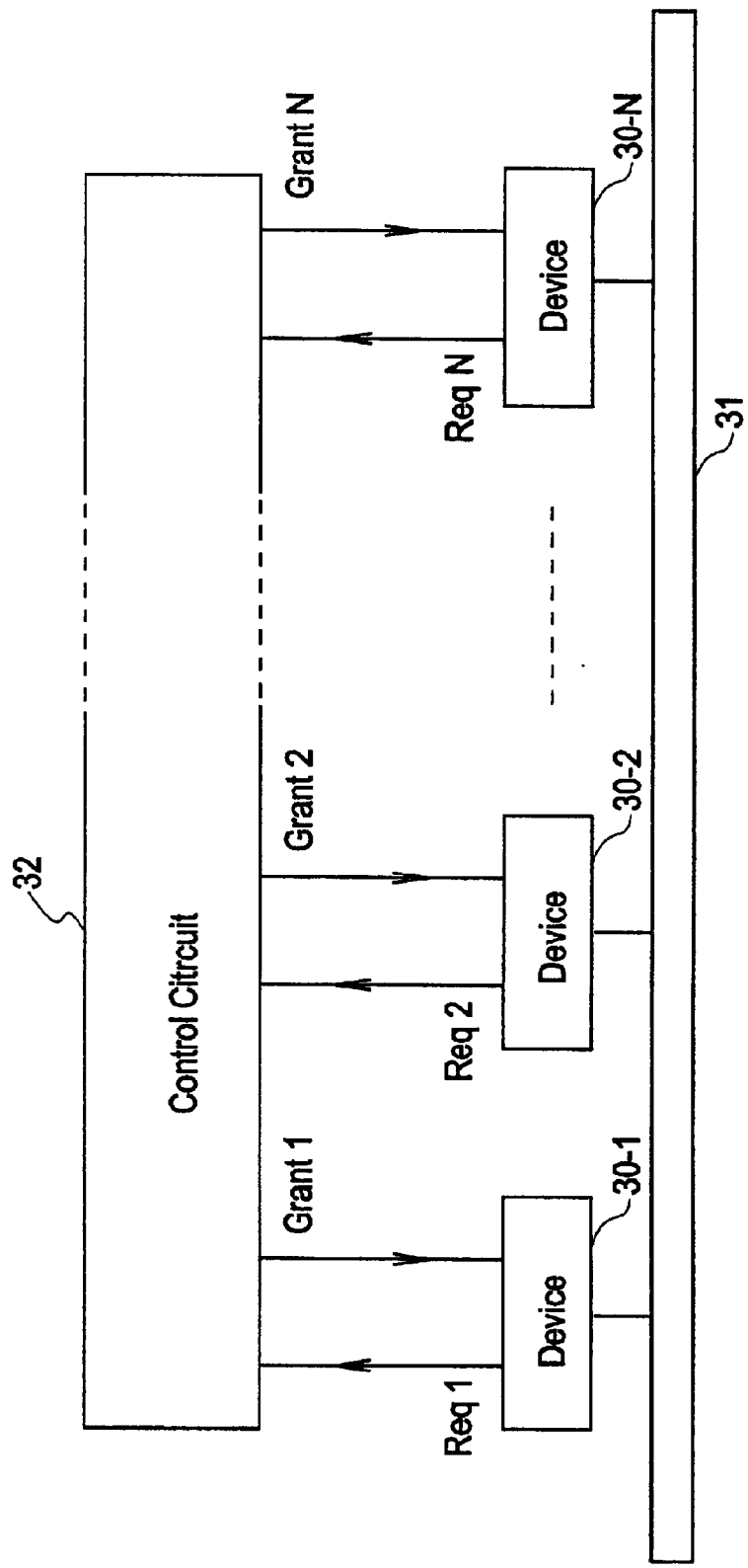
FIG. 10 is a block diagram of a conventional bus arbitrator.

This transition signaling circuit can be used, for example, as one unit in the control circuit 32 of the bus arbitrator in FIG. 10. Compared with the principle explanation diagram in FIG. 2, this transition signaling circuit has a configuration where the first and second blocks 40-1 and 40-2 in FIG. 2 are combined, and when devices 30-1, . . . in FIG. 10 send a device request signal Req, for example, this circuit executes the required arbitration and then outputs the device enabling signal Grant to the device 30-1, . . . .

In FIG. 1, in the first Muller C element with an inverter 10-1, a request event ReqIn, which is the first transition signal, is input to the first positive input terminal, a feedback signal S, which is a transition signal, is input to the second negative input terminal, and a response event AckOut, which is the second transition signal, is output from the first output terminal. The first input terminal of the first gate circuit (e.g. two input OR gate) 41-1 is connected to the first output terminal of the Muller C element with an inverter 10-1, and the device enabling signal Grant, which is the first control signal, is input to the second input terminal, and the second output terminal is connected to the second positive input terminal of the second Muller C element with an inverter 10-2. In the Muller C element with an inverter 10-2, a response event AckIn, which is the third transition signal, is input to the second negative input terminal, and a feedback signal S is output from the third output terminal.

The third output terminal of the Muller C element with an inverter 10-2 is connected to the first negative input terminal of the Muller C element with an inverter 10-1, and is also connected to the third input terminal of the second gate circuit (e.g. two input AND gate) 41-2 and the fifth input terminal of the third gate circuit (e.g. two input AND gate) 41-3. In the AND gate 41-2, the second control signal (e.g. device request signal Req from a device) is input to the fourth input terminal, and a request event ReqOut, which is the fourth transition signal, is output from the fourth output terminal. In the AND gate 41-3, a device request signal Req, which is the second control signal, is input to the sixth input terminal, a device enabling signal Grant, which is the first control signal, is output from the fifth output terminal, and this device enabling signal Grant is fed back to the second input terminal of the OR gate 41-1, and is sent to the device.

In the transition signaling circuit in FIG. 1, the loop, which is comprised of the OR gate 41-1 and the Muller C element with an inverter 10-2 in FIG. 2, is comprised of the Muller C element with an inverter 10-2, the OR gate 41-1, and the AND gate 41-3.

After the request event ReqIn is canceled, and the Muller C element with an inverter 10-1 cancels the output of the response event AckOut, the OR gate 41-1 inserted into the loop remains to maintain the token as long as the device enabling signal Grant is output from the AND gate 41-3. If no device request signal Req is output from a device, however, the feedback signal S, which is output from the Muller C element with an inverter 10-2, is applied to the AND gate 41-2 and the request event ReqOut is output from the AND gate 41-2, and output of the device enabling signal Grant from the AND gate 41-3 stops, the above mentioned loop is canceled, and as a result, the token is transferred to the next block.

(2) Operation

Figure 4:
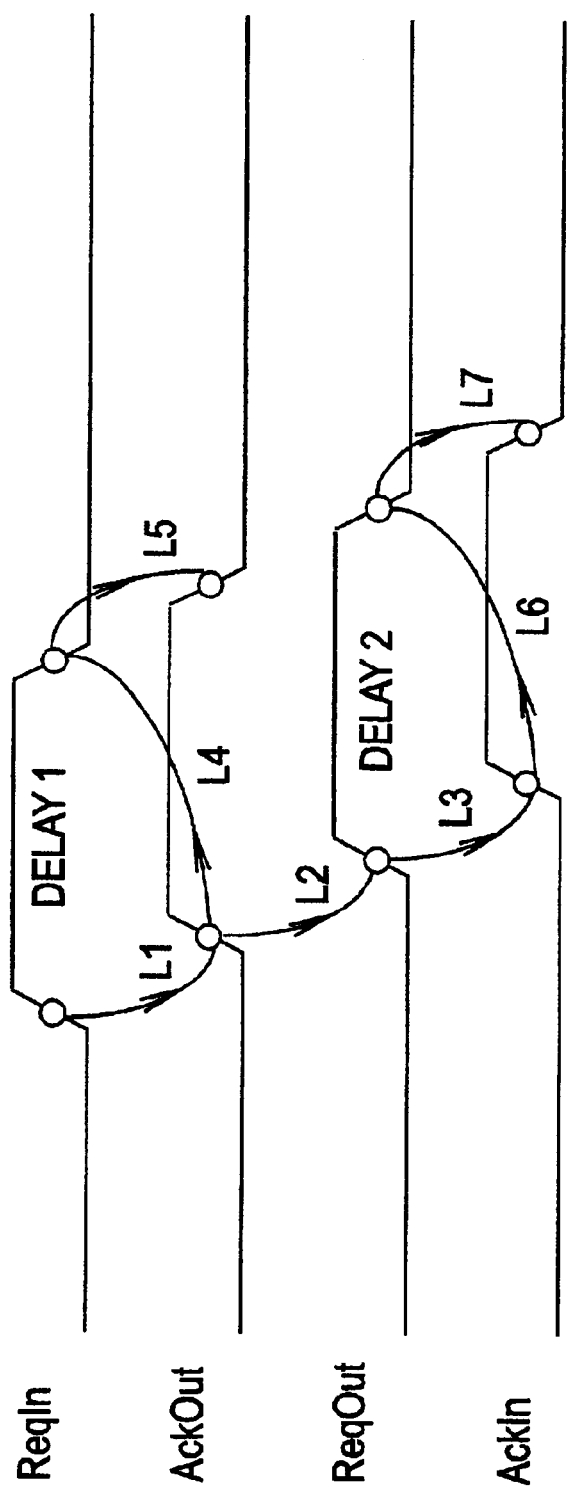
FIG. 4 is a timing waveform diagram depicting the operation in FIG. 1.

FIG. 4 is a timing waveform diagram depicting the operation in FIG. 1.

Operation in FIG. 1 will now be described with reference to FIG. 4.

When an input request event ReqIn is generated, an output response event AckOut of the Muller C element with an inverter 10-1 is generated by the link L1. The output response event AckOut generates an output request event ReqOut by the link L2 via the OR gate 41-1, the Muller C element with an inverter 10-2, and the AND gate 41-3. The AND gate 41-2 is disposed to secure the delay time (e.g. DELAY 2) in FIG. 2. If the delay time DELAY 2 is not secured, the input response event AckIn may be output immediately by the link L3, which causes contention with the output request event ReqOut, so the AND gate 41-2 prevents this.

After the delay time DELAY 2, the output request event ReqOut disappears by the link L6. The disappearance of the output request event ReqOut leads to the disappearance of the input response event AckIn by the link L7. Generation of the output response event AckOut, on the other hand, leads to the disappearance of the input request event ReqIn after a predetermined delay time (e.g. DELAY 1) by the link L4, and this disappearance leads to the disappearance of the output response event AckOut by the link L5.

In the operation of the transition signaling circuit in FIG. 1, it is important whether a token is owned or not. If a token is not owned, that is, if the feedback signal S, which is an event, is not generated, then the device enabling signal Grant is not output to the device by the AND gate 41-3, and the device remains in standby status even if the device outputs the device request signal Req.

(3) Effect

The first embodiment has the following effects (i) and (ii).

(i) According to the present embodiment, the latch circuit of a control event, which a conventional asynchronous transition signaling circuit does not have, can be configured. In the transition signaling circuit in FIG. 1, an event does not directly control the logic circuit, instead control is shifted by transferring a token (feedback signal S). In this sense, the device request signal Req and the device enabling signal Grant in FIG. 1 can be regarded as a signal for controlling an event.

(ii) The transition signaling circuit in FIG. 1 can be applied to various units and circuits, such as a bus arbitrator.

(Second Embodiment)

(1) Configuration

Figure 5:
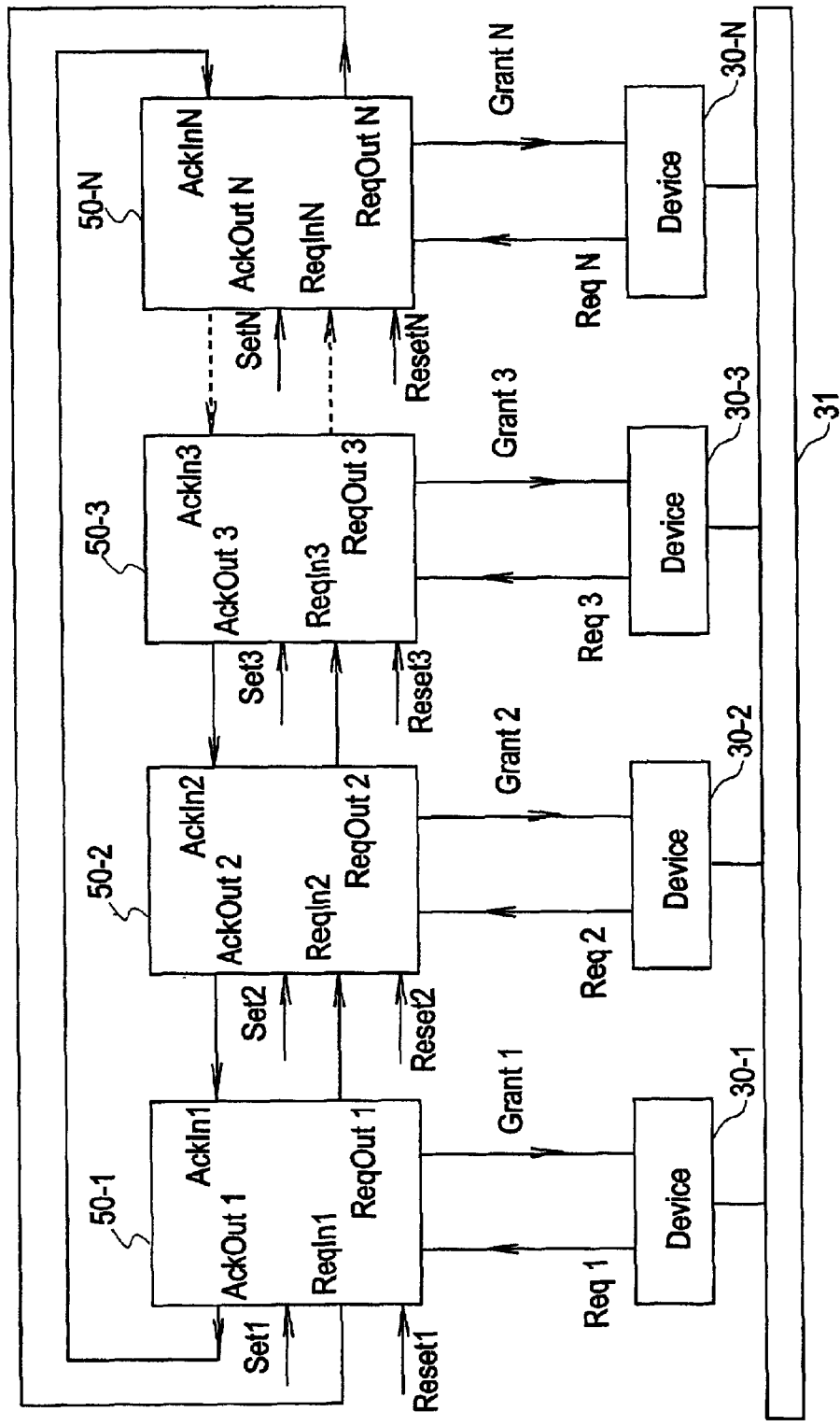
FIG. 5 is a block diagram depicting the bus arbitrator according to the second embodiment of the present invention.

FIG. 5 is a block diagram of a bus arbitrator depicting the second embodiment of the present invention. Composing elements the same as the composing elements of the transition signaling circuit of the first embodiment shown in FIG. 1 and of the conventional bus arbitrator shown in FIG. 10 are denoted with the same numerals.

This bus arbitrator has a predetermined resource (e.g. common bus) 31, and to share this resource, a plurality N of (N is two or more arbitrary positive integers) devices 30-1–30-N are connected. Each device 30-1–30-N is comprised of devices suitable for asynchronous transition control, such as a DMA controller and timer, or devices not suitable for asynchronous transition control, and has a function to output a device request signal Req 1–Req N, which is a second control signal, respectively, and to input a device enabling signal Grant 1–Grant N respectively.

A control means to execute arbitration to select the occupancy of the common bus 31 is connected to these devices 30-1–30-N. A control means has a plurality (N) of transition signaling circuits 50-1–50-N which is comprised of the transition signaling circuits in FIG. 1, where these transition signaling circuits are connected in a ring-shape, and arbitration of each device 30-1–30-N is controlled by each transition signaling circuit 50-1–50-N. In each of these transition signaling circuits 50-1–50-N, input terminals Set 1–Set N and Reset 1–Reset N of the set signals and reset signals are disposed so as to correspond to each other.

Each transition signaling circuit 50-1–50-N has a terminal for input request event ReqIn 1–ReqIn N, a terminal for an output response event AckOut 1–AckOut N, a terminal for an input response event AckIn 1–AckIn N, and a terminal for an output request event ReqOut 1–ReqOut N respectively. And the terminal for an output request event ReqOut is connected to the terminal for the input request event ReqIn of the next transition signaling circuit, and the terminal of the output response event AckOut is connected to the terminal of the input response event AckIn of the previous transition signaling circuit cyclically. As a result, even if one token is held by a transition signaling circuit (one of 50-1–50-N), the token cycles through the transition signaling circuits 50-1–50-N counterclockwise, for example, in FIG. 5, and any one device 30-1–30-N can have a chance to occupy the common bus 31 by the transition signaling circuits 50-1–50-N.

Here in order to assign a token to only one transition signaling circuit of the transition signaling circuits 50-1–50-N and not to others, the initial status can be set for each transition signaling circuit 50-1–50-N.

Figure 6B:
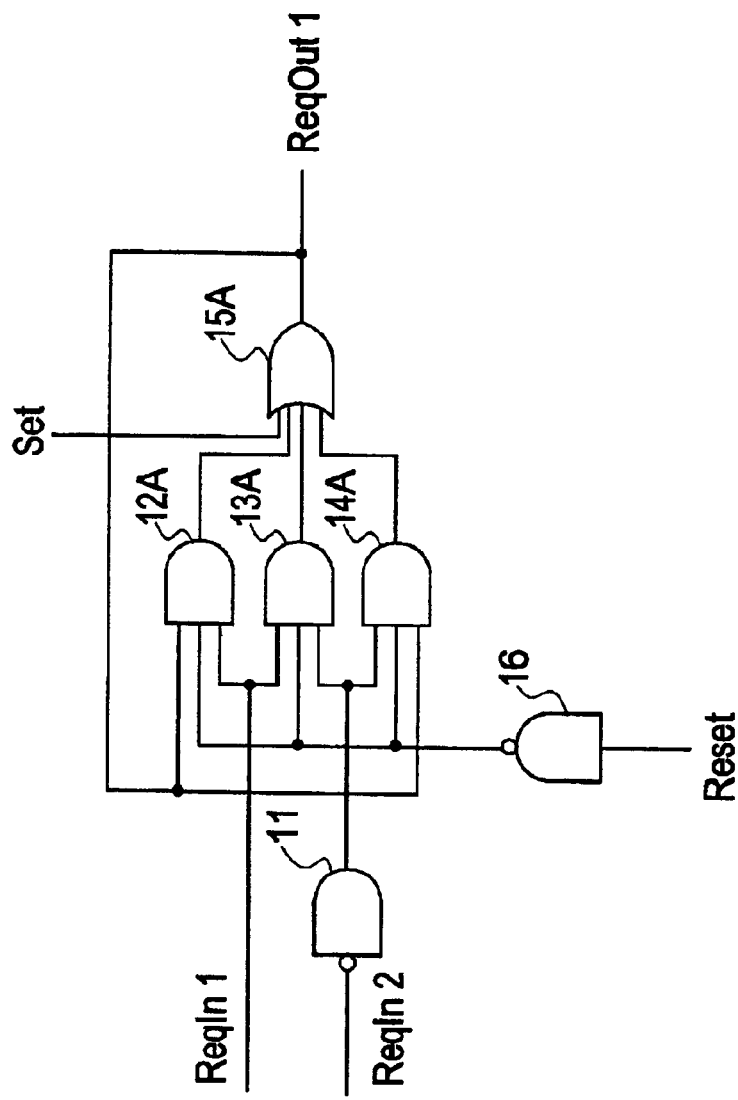
FIG. 6(B) is a logical circuit diagram of FIG. 6(A)
Figure 6A:
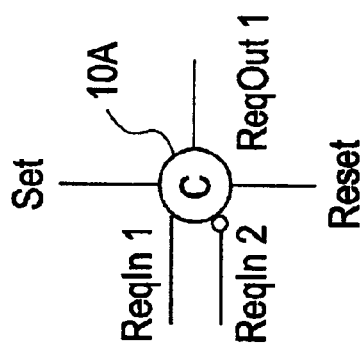
FIG. 6(A) is a logical symbol diagram used for describing the Muller C element with an inverter which has a set terminal and a reset terminal according to the second embodiment of the present invention.

For example, by adding a terminal for the reset signal Reset on the feedback line of the OR gate circuit 15, and a negative logic AND gate circuit to input the reset signal Reset, or a terminal for a set signal Set and a positive logic OR gate circuit to input the set signal Set to the Muller C element with an inverter in FIG. 7, the Muller C element with an inverter which has a reset or set terminal can be easily configured. FIG. 6(A) and FIG. 6(B) show configuration examples of the Muller C element with an inverter which have a reset or set terminal.

FIG. 6(A) and FIG. 6(B) are diagrams depicting the Muller C element with an inverter which has a set terminal and a reset terminal according to the second embodiment of the present invention, where FIG. 6(A) is a logical symbol diagram, and FIG. 6(B) is a logical circuit diagram, and here composing elements the same as the composing elements as in FIG. 7 are denoted with the same numerals.

The Muller C element with an inverter 10A, which has the set terminal and the reset terminal in FIG. 6, is comprised of an inverter circuit 11, similar to FIG. 7, three input AND gate circuits 12A–14A, which are disposed instead of the two input AND gate circuits 12–14 in FIG. 7, a four input OR gate circuit 15A, which is disposed instead of the three input OR gate circuit 15 in FIG. 7, and an inverter circuit 16, which inverts the reset signal Reset. The reset signal Reset is supplied to the third input terminal of the first, second and third AND circuits 12A, 13B and 14A respectively. The set signal Set, on the other hand, is supplied to the fourth input terminal of the OR gate circuit 15A. According to such a configuration, the Muller C element with an inverter 10A can be set to the initial status by the reset signal Reset or by the set signal Set.

If each transition signaling circuit 50-1–50-N is configured using such a Muller C element with an inverter with a reset or set or a Muller C element with an inverter 10A with a set and reset, it can be set such that a token is assigned to only one transition signaling circuit and not to others.

(2) Operation

Let us consider the case of the bus arbitrator in FIG. 5, where a plurality of devices 30-1, . . . request use of the common bus 31, and a plurality of device request signals Req 1, . . . become valid.

If there is a transition signaling circuit having a token (e.g. 50-2), the device request signal Req 2 from the device 30-2 is accepted, and the device enabling signal Grant 2 is output from the transition signaling circuit 50-2. Since the other transition signaling circuits 50-1, 50-3, . . . do not have a token, the device enabling signals Grant 1, Grant 3, . . . are not output. Therefore the device 30-2 occupies the common bus 31, and this occupancy continues until the device 30-2 cancels the device request signal Req 2. When the device 30-2 cancels the device request signal Req 2, the token is transferred counterclockwise to the transition signaling circuit 50-3, . . . in FIG. 5, and the first device for which the device request signal Req is made valid outputs the device enabling signal Grant and occupies the common bus 31 next.

(3) Effect

In the present embodiment, the asynchronous bus arbitrator is configured by combining the transition signaling circuits 50-1–50-N, so even the devices 30-1, . . . which are not really appropriate for asynchronous transition control can be subject to arbitration.

(Form of Use)

The present invention is not restricted by the above embodiments, but can be modified and used in various ways. Examples of modification and the form of use are explained in (a) and (b).

(a) The gate in FIG. 1, FIG. 6 and FIG. 7 may be replaced with a gate circuit other than the one illustrated here.

(b) In FIG. 5, the case of a bus arbitrator was described, but the transition signaling circuit in FIG. 1 can be applied to the case of sharing a predetermined resource, such as a computer, other than the common bus 31.

What is claimed is:

1. A transition signaling circuit, comprising:

a first Muller C element with an inverter having a first positive input terminal for inputting a first transition signal, a first negative input terminal for inputting a feedback signal, and a first output terminal for outputting a second transition signal, where said second transition signal having a same logical level as said first transition signal is output from said first output terminal when said first transition signal and said feedback signal are in different logical levels, and the previous state is maintained when said first transition signal and said feedback signal are in a same logical level;

a first gate circuit having a first input terminal for inputting said second transition signal which is output from the first output terminal of said first Muller C element with an inverter, a second input terminal for inputting a first control signal, and a second output terminal which is operated by said first control signal and outputs an output signal corresponding to said second transition signal in ON status; and a second Muller C element with an inverter having a second positive input terminal for inputting said output signal which is output from said first gate circuit, a second negative input terminal for inputting a third transition signal, and a third output terminal for outputting said feedback signal to the first negative input terminal of said first Muller C element with an inverter, where said feedback signal having a same logical level as said output signal is output from said third output terminal when said output signal of said first gate circuit and said third transition signal are in different logical levels, and the previous state is maintained when said output signal of said first gate circuit and said third transition signal are in a same logical level.

2. The transition signaling circuit according to claim 1, further comprising:

a second gate circuit having a third input terminal connected to the third output terminal of said second Muller C element with an inverter, a fourth input terminal for inputting a second control signal whereby the logical level transits, and a fourth output terminal which is operated by said second control signal, turns ON when said second control signal is in the second logical level, and outputs a fourth transition signal corresponding to said feedback signal; and a third gate circuit, having a fifth input terminal connected to the third output terminal of said second Muller C element with an inverter, a sixth input terminal for inputting said second control signal, and a fifth output terminal which is operated by said second control signal, turns ON when said second control signal is in the first logical level, and outputs said first control signal corresponding to said feedback signal to the second input terminal of said first gate circuit.

3. The transition signaling circuit according to claim 1, wherein said first Muller C element with an inverter comprises an inverter circuit for signal inversion, two input type first, second and third AND gate circuits, and a three input type OR gate circuit;

the input terminal of said inverter circuit is said first negative input terminal and the output terminal thereof is connected to the second input terminal of said second AND circuit and the first input terminal of said third AND circuit;

said first positive input terminal is connected to the second input terminal of said first AND circuit and the first input terminal of said second AND circuit;

the output terminals of said first, second and third AND gate circuits are connected to the first, second and third input terminals of said OR gate circuit respectively; and the output terminal of said OR gate circuit is said first output terminal, and said first output terminal is connected to the first input terminal of said first AND gate circuit and the second input terminal of said third AND gate circuit respectively.

4. The transition signaling circuit according to claim 1, wherein said second Muller C element with an inverter comprises an inverter circuit for signal inversion, two input type first, second and third AND gate circuits, and a three input type OR gate circuit;

the input terminal of said inverter circuit is said second negative input terminal and the output terminal thereof is connected to the second input terminal of said second AND circuit and the first input terminal of said third AND circuit;

said second positive input terminal is connected to the second input terminal of said first AND circuit and the first input terminal of said second AND circuit;

the output terminals of said first, second and third AND gate circuits are connected to the first, second and third input terminals of said OR gate circuit respectively; and the output terminal of said OR gate circuit is said third output terminal and said third output terminal is connected to the first input terminal of said first AND gate circuit and the second input terminal of said third AND gate circuit respectively.

5. An arbitrator, comprising:

a plurality of devices which output a second control signal respectively to request use when a predetermined resource is shared;

a plurality of transition signaling circuits disposed corresponding to said plurality of devices; and control means for executing arbitration among said devices, wherein said transition signaling circuit comprises:

a first Muller C element with an inverter having a first positive input terminal for inputting a first transition signal, a first negative input terminal for inputting a feedback signal, and a first output terminal for outputting a second transition signal, where said second transition signal having a same logical level as said first transitional signal is output from said first output terminal when said first transition signal and said feedback signal are in different logical levels, and the previous state is maintained when said first transition signal and said feedback signal are in a same logical level;

a first gate circuit having a first input terminal for inputting said second transition signal which is output from the first output terminal of said first Muller C element with an inverter, a second input terminal for inputting a first control signal, and a second output terminal which is operated by said first control signal and outputs an output signal corresponding to said second transition signal in ON status;

a second Muller C element with an inverter having a second positive input terminal for inputting said output signal which is output from said first gate circuit, a second negative input terminal for inputting a third transition signal, and a third output terminal for outputting said feedback signal to the first negative input terminal of said first Muller C element with an inverter, where said feedback signal having a same logical level as said output signal is output from said third output terminal when said output signal of said first gate circuit and said third transition signal are in different logical levels, and the previous state is maintained when said output signal of said first gate circuit and said third transition signal are in a same logical level;

a second gate circuit having a third input terminal connected to the third output terminal of said second Muller C element with an inverter, a fourth input terminal for inputting a second control signal whereby the logical level transits, and a fourth output terminal which is operated by said second control signal, turns ON when said second control signal is in the second logical level, and outputs a fourth transition signal corresponding to said feedback signal; and a third gate circuit, having a fifth input terminal connected to the third output terminal of said second Muller C element with an inverter, a sixth input terminal for inputting said second control signal, and a fifth output terminal which is operated by said second control signal, turns ON when said second control signal is in the first logical level, and outputs said first control signal corresponding to said feedback signal to the second input terminal of said first gate circuit, wherein an output terminal to output the fourth transition signal in the transition signaling circuit in a previous stage out of said plurality of transition signaling circuits is connected to an input terminal for inputting the first transition signal in the transition signaling circuit in the next stage, and the input terminal for inputting the third transition signal in the transition signaling circuit in the previous stage is connected to the output terminal for outputting the second transition signal in the transition signaling circuit in the next stage so that said plurality of transition signaling circuits are cascade-connected, and said control means outputs a first control signal to enable use to arbitrate the contention of devices when said second control signals which are output from said plurality of devices are input.

6. The arbitrator according to claim 5, wherein a token exists only in one of the plurality of transition signaling circuits by setting an initial value for the Muller C element with an inverter constituting the transition signaling circuit.

7. The arbitrator according to claim 6, wherein the predetermined resource is a common bus, and arbitration is executed such that only one device out of a plurality of devices connected to the common bus occupies said common bus.

8. The arbitrator according to claim 5, wherein said first Muller C element with an inverter comprises an inverter circuit for signal inversion, three input type first, second and third AND gate circuits, a four input type OR gate circuit, and an inverter circuit for reset signal inversion;

the input terminal of said inverter circuit for signal inversion is said first negative input terminal and the output terminal thereof is connected to the second input terminal of said second AND circuit and the first input terminal of said third AND circuit;

said first positive input terminal is connected to the second input terminal of said first AND circuit and the first input terminal of said second AND circuit;

the output terminals of said first, second and third AND gate circuits are connected to the first, second and third input terminals of said OR gate circuit respectively;

the output terminal of said OR gate circuit is said first output terminal and said first output terminal is connected to the first input terminal of said first AND gate circuit and the second input terminal of said third AND gate circuit respectively;

said inverter circuit for reset signal inversion comprises an input terminal to which a reset signal is supplied from the outside and an output terminal connected to the third input terminals of said first, second and third AND gate circuits respectively; and said OR gate circuit comprises a fourth input terminal to which a set signal is supplied from the outside.

9. The arbitrator according to claim 5, wherein said second Muller C element with an inverter comprises an inverter circuit for signal inversion, three input type first, second and third AND gate circuits, a four input type OR gate circuit, and an inverter circuit for reset signal inversion;

the input terminal of said inverter circuit for signal inversion is said second negative input terminal, and the output terminal thereof is connected to the second input terminal of said second AND circuit and the first input terminal of said third AND circuit;

said second positive input terminal is connected to the second input terminal of said first AND circuit and the first input terminal of said second AND circuit;

the output circuits of said first, second and third AND gate circuits are connected to the first, second and third input terminals of said OR gate circuit respectively;

the output circuit of said OR gate circuit is said third output terminal, and said third output terminal is connected to the first input terminal of said first AND gate circuit and the second input terminal of said third AND gate circuit respectively;

said inverter circuit for reset signal inversion has an input terminal to which a reset signal is supplied from the outside, and an output terminal connected to the third input terminals of said first, second and third AND gate circuits respectively; and said OR gate circuit has a fourth input terminal to which a set signal is supplied from the outside.

* * * * *